United States Patent [19]

Mock

[11] Patent Number: 5,679,903
[45] Date of Patent: Oct. 21, 1997

[54] REFRIGERANT MONITORING SET INCLUDING A MANOMETER AND A TRANSPARENT DISK MOUNTABLE THEREON

[76] Inventor: Bruno Armin Mock, Buolterlistsrasse 63, CH-6052 Hergiswil, Switzerland

[21] Appl. No.: 682,355

[22] Filed: Jul. 17, 1996

[30] Foreign Application Priority Data

Aug. 29, 1995 [CH] Switzerland .................. 02 454/95

[51] Int. Cl.$^6$ .................. G01L 7/14; G01L 19/02
[52] U.S. Cl. .................. 73/740
[58] Field of Search .................. 73/708, 740, 741, 73/756

[56] References Cited

U.S. PATENT DOCUMENTS 1,420,953 6/1922 Berry .................. 73/740
3,543,586 12/1970 Waite .................. 73/756

Primary Examiner—Richard Chilcot
Assistant Examiner—William L. Oen
Attorney, Agent, or Firm—Spencer & Frank

[57] ABSTRACT

A refrigerant monitoring set includes a manometer and at least one transparent disk configured to be detachably mounted on the manometer. The manometer includes a manometer face having a pressure scale thereon, and a housing defining an outer window side and including a window at the outer window side thereof, the manometer face being disposed in the housing such that the pressure scale is visible through the window of the housing. The disk is configured to be detachably mounted on the housing at the outer window side thereof by being pressed onto the housing. The disk further has a temperature scale thereon corresponding to a predetermined refrigerant, and is further rotatable with respect to the housing after it has been mounted thereon for achieving a zero position alignment of the temperature scale on the disk and the pressure scale on the manometer face for correlating the temperature scale to the pressure scale.

6 Claims, 1 Drawing Sheet

REFRIGERANT MONITORING SET INCLUDING A MANOMETER AND A TRANSPARENT DISK MOUNTABLE THEREON

FIELD OF THE INVENTION

The present invention relates to a refrigerant monitoring set including a manometer and at least one transparent disk mountable thereon.

In many technological fields, in refrigeration technology for example, it is necessary to monitor pressurized media, such as refrigerant, and manometers are commonly used as a measuring instrument in performing this task.

In the field of refrigeration technology, such as the introduction of refrigerant into refrigerators, or especially automobile air-conditioning systems, control consoles are equipped with manometers for the purpose of precisely monitoring the relatively dangerous introduction process. The manometer, in addition to one pressure dial, such as one for pressures from −1 to +10 bar, is equipped with at least one temperature dial, such as one for temperatures from −60° C. to +30° C., whereby the temperature of the pressurized refrigerant is in a given ratio to the pressure, and the temperature and pressure dials are in a corresponding ratio.

The most important requirements for precise monitoring of the temperature and pressure are visual clarity and easy comprehension of the manometer dials by the operator.

These requirements are fulfilled when the manometer is equipped with at best two additional dials for the different pressure-related temperatures of two different refrigerants, isobutane R-600-a and fluorocarbon R-134-a, for example, in addition to the pressure dial.

However, dealing with today's large number of refrigerants, which are used for ecological reasons, is no longer possible with conventional dial technology. Either a different manometer can be used for each refrigerant, which is, of course, impracticable, or a universal temperature dial with a preset conversion factor to the pressure dial can be used for all known refrigerants. The relevant values would then be taken from a book of tables. The above solution is also extremely troublesome for the operator, especially considering the fact that approximately 30 different refrigerants are presently available on the market, and this number is rising.

SUMMARY OF THE INVENTION

Therefore, the object of the present invention is to create a manometer of the type described above which allows the direct reading of pressure-related temperature dials for each known refrigerant.

This object is achieved according to the invention by providing at least one transparent disk which can be mounted from the outside on the window side by being pressed onto the manometer housing, and this disk has at least one temperature dial for a given refrigerant which can be assigned to a pressure dial on the manometer face by means of zero-position alignment.

Such measures make it possible to assign a number of such disks corresponding to the number of refrigerants employed to a manometer arrangement as a so-called mechanical aid or control console for systems used in working with pressurized gas and/or liquid media. The operator preferably takes such a disk from a box with labeled sections and presses it onto the manometer for the purpose of setting the zero position, after which the values can be read in the conventional way. This method is extremely simple and does not allow the possibility of error.

In a preferable embodiment, the area near the edge of the disk is provided with catches extending backward which are spaced along the disk's circumference. These catches grip the entire circumference of the manometer housing or a part thereof, optionally in the form of flanges which extend backward.

BRIEF DESCRIPTION OF THE DRAWINGS

An example of an embodiment of the invention is shown in the drawings below, in which.

DETAILED DESCRIPTION OF THE INVENTION

Figure 1:
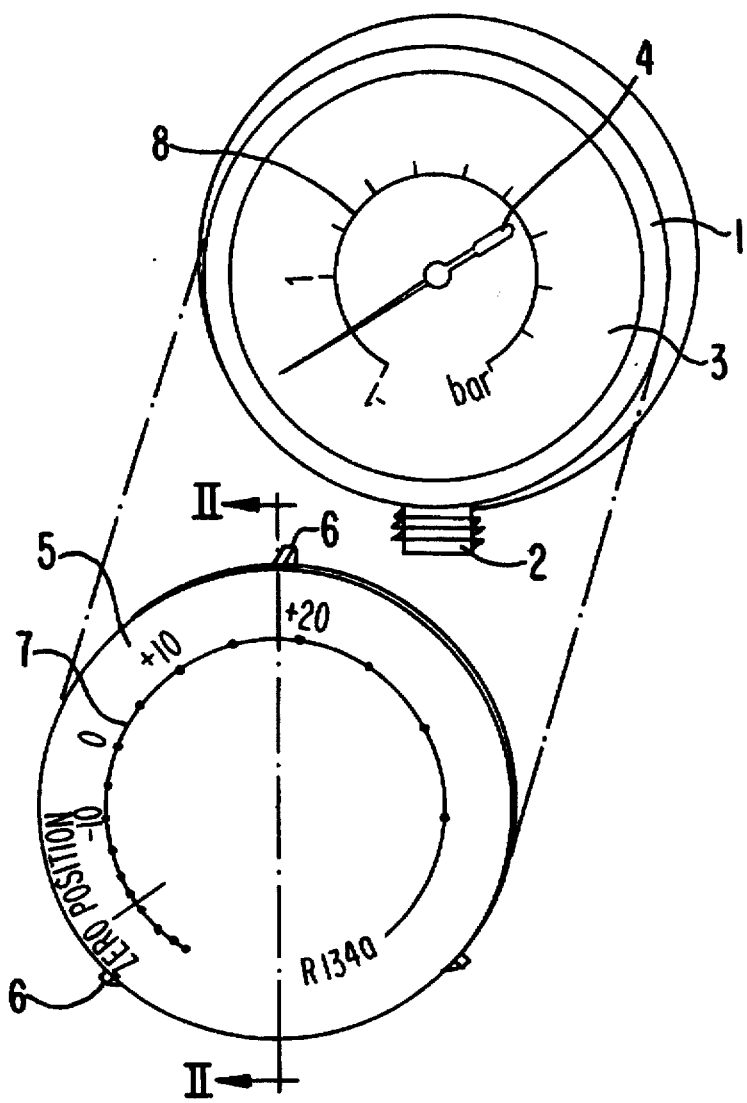
FIG. 1 is schematic exploded view of a manometer according to the invention.

The known manometer with the housing 1, connection fitting 2, internal face 3 and indicator 4 may be assembled with a transparent disk 5 which can be mounted from the outside of the manometer on the window side by being pressed onto the manometer housing 1. This disk 5 has at least one temperature scale 7 for a given refrigerant, and this temperature scale 7 can be assigned to a pressure scale 8 on the manometer face 3 by means of zero-position alignment. When several disks are used, these can be exchanged depending on the refrigerant whose temperature is to be monitored.

Figure 2:
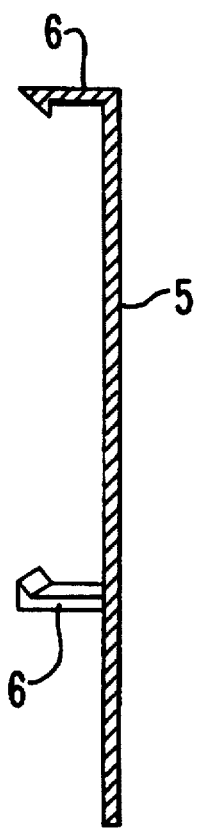
FIG. 2 is view of the section along the line II—II in FIG. 1.

The disk 5 is preferably made of transparent plastic and provided with catches near its edge which extend backward, and these catches, constructed in the shape of flanges 6 spaced along the circumference as shown in FIG. 2, extend a short distance to the rear to grip the entire circumference of the manometer housing or a part thereof.

The disk 5 can also be constructed in the shape of a can (i.e. cylinder), whereby the circumference wall can encompass the manometer housing.

The disk with the pressure scale can easily be pressed onto the manometer housing and turned for zero-position alignment, whereby sufficient bonding pressure between disk and housing is useful for the purpose of effectively preventing the disk 5 from accidentally twisting or being stripped off.

I claim:

1. A refrigerant monitoring set comprising: a manometer including:

a manometer face having a pressure scale thereon; and a housing defining an outer window side and including a window at the outer window side thereof, the manometer face being disposed in the housing such that the pressure scale is visible through the window of the housing; and at least one transparent disk configured to be detachably mounted on the housing at the outer window side thereof by being pressed onto the housing, the disk having a temperature scale thereon corresponding to a predetermined refrigerant, the disk further being rotatable with respect to the housing after it has been mounted thereon for achieving a zero position alignment of the temperature scale on the disk and the pressure scale on the manometer face for correlating the temperature scale to the pressure scale.

2. The refrigerant monitoring set according to claim 1, wherein the disk defines a back side further includes clamps near edges thereof, the clamps extending in a direction toward the back side of the disk.

3. The refrigerant monitoring set according to claim 2, wherein the clamps are spaced along a circumference of the disk and are configured to grip the housing along a circumference thereof.

4. The refrigerant monitoring set according to claim 3, wherein the clamps comprise flanges.

5. The refrigerant monitoring set according to claim 2, wherein the clamps are configured to grip the housing along an entire circumference thereof.

6. The refrigerant monitoring set according to claim 1, wherein the at least one transparent disk comprises a plurality of transparent disks having respective temperature scales thereon corresponding to respective predetermined refrigerants.

* * * * *